Figure 9:
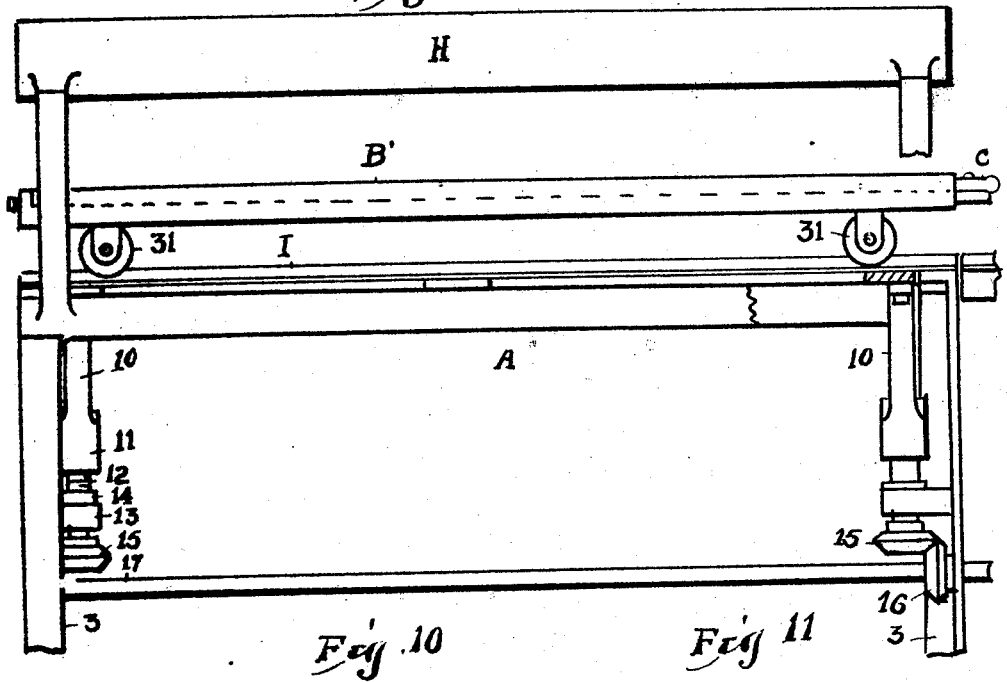

Nov. 3, 1925.  
R. W. GEARHART  
1,560,050  
APPARATUS FOR FILLING CONTAINERS  
Filed April 17, 1924  
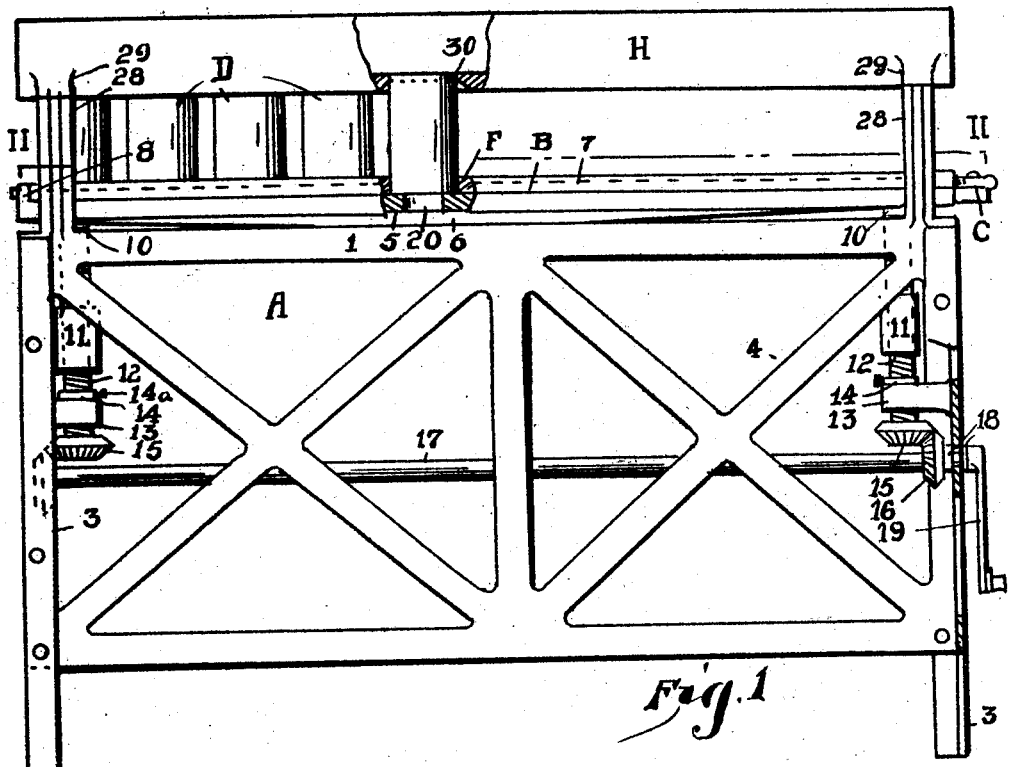
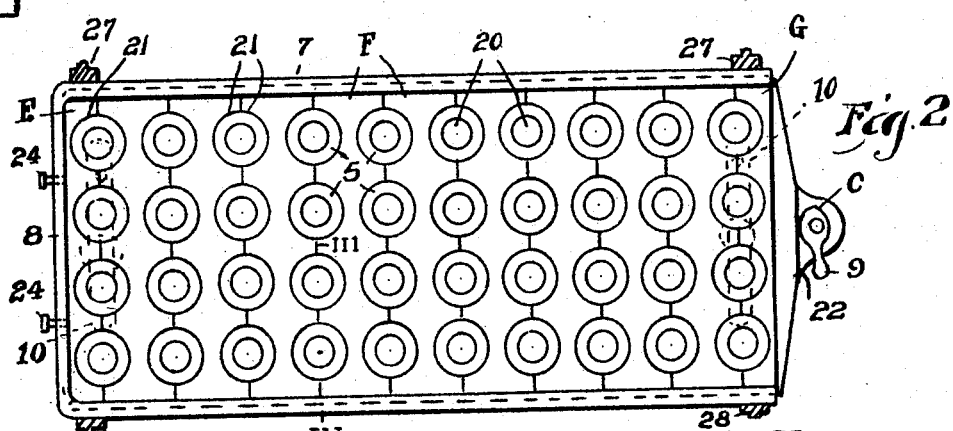
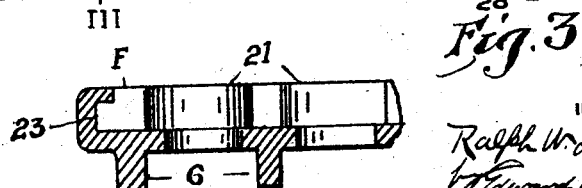
INVENTOR  
Ralph W. Gearhart Nov. 3, 1925.  1,560,050
R. W. GEARHART
APPARATUS FOR FILLING CONTAINERS
Filed April 17, 1924  3 Sheets-Sheet 2
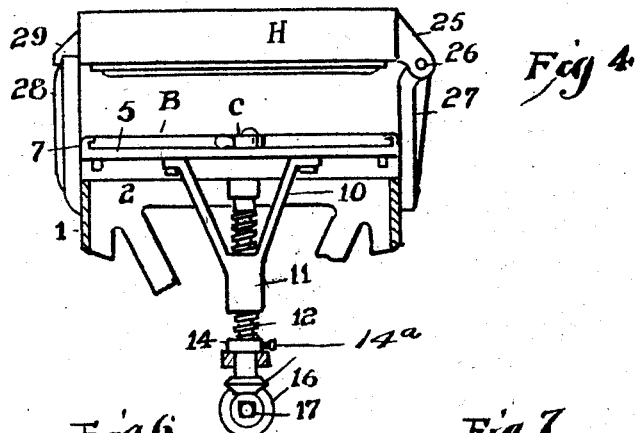
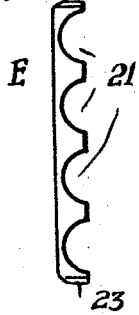
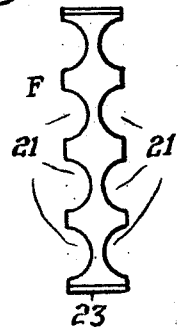
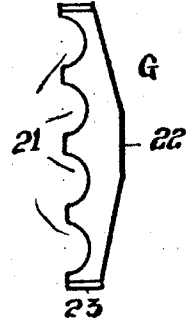
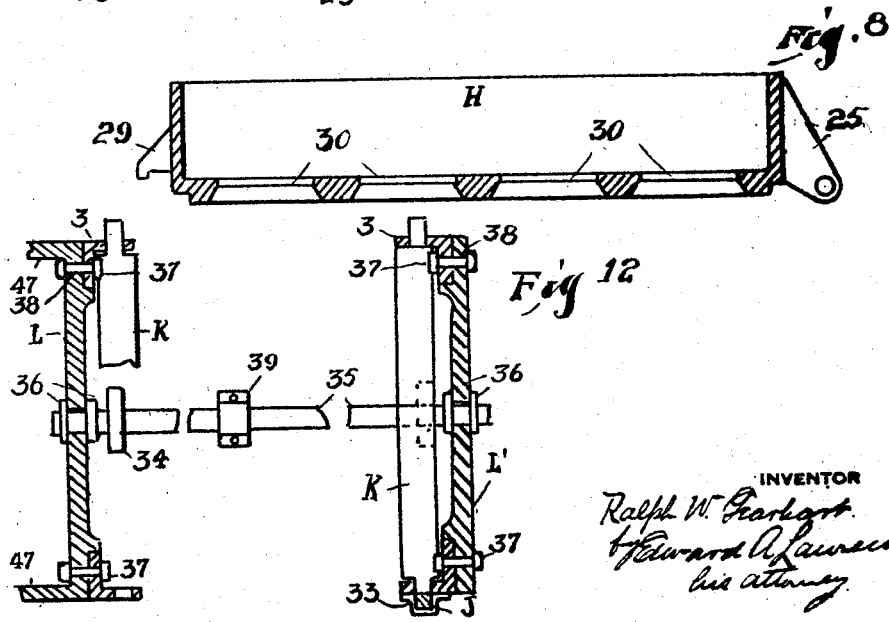
INVENTOR
Ralph W. Gearhart
by Edward A. Lawrence
his attorney Nov. 3 1925.                                           1,560,050
R. W. GEARHART
APPARATUS FOR FILLING CONTAINERS
Filed April 17, 1924          3 Sheets-Sheet 3

INVENTOR
Ralph W. Gearhart
by Edward C. Lawrence
his attorney

Patented Nov. 3, 1925.

1,560,050

UNITED STATES PATENT OFFICE.

RALPH W. GEARHART, OF CLEARFIELD, PENNSYLVANIA, ASSIGNOR TO GEARHART SALES CABINET CO., INC., OF CLEARFIELD, PENNSYLVANIA, A CORPORATION OF DELAWARE.

APPARATUS FOR FILLING CONTAINERS.

Application filed April 17, 1924. Serial No. 707,048.

*To all whom it may concern:*

Be it known that I, RALPH W. GEARHART, a citizen of the United States of America, and residing in the borough of Clearfield, county of Clearfield, and State of Pennsylvania, have invented or discovered the new, useful, and Improved Apparatus for Filling Containers, of which the following is a specification.

My invention relates to the filling of cartons with ice cream or other substances.

In the practice now in general use for filling cartons with ice cream or other frozen products or substances, the cartons, usually made of paper, are held in turn under the spout of a freezer and filled with a substance which is in a semi-frozen or slushy state. The lids are then applied to the cartons and the latter are placed in a refrigerating chamber to freeze the contents hard.

Retail distributers of ice cream and other frozen food products receive the goods from the manufacturer packed in bulk in the large cans in which they have been frozen, or in individual packages or cartons. The latter method is growing in popularity for several reasons. Thus, for instance, the retailer does not suffer a loss from shrinkage, and the handling of the goods is facilitated and better sanitation is obtained. The manufacturers, however, find that the added cost of packing and delivering their products in package form by the present practice is very considerable.

The object which I have in view is the provision of improved carton filling apparatus, which will reduce the time and labor of packing such products in individual cartons or retail sales packages, and the improving of the sanitary conditions thereof, so that the extra cost will be minimized and the advantages so emphasized that the manufacturers will prefer the package plan to the bulk plan of distribution.

Generally speaking my improved apparatus is characterized by the provision of a carton supporting table upon which a plurality of the cartons are placed for filling and whereon they are clamped or held in proper position, and a filling lid which is apertured to fit down over the cartons, the tops of the cartons being inserted into the orifices of the lid, so that the semi-frozen substance supplied to the lid may be filled into the cartons.

I provide for a relative movement between the table and the lid whereby, after the cartons have been properly spaced or spotted on the table their upper ends are inserted up into the orifices of the lid with their tops flush with the floor surface of the lid so that the substance may be filled into the cartons flush with the top of the same without danger of the substance running down the outsides of the cartons and soiling them. Then the lid and the table are supported so that the cartons may be capped or lidded and removed to the hardening room.

To further facilitate the operation of carton filling I may develop the carton table in the form of a car which may be loaded with empty cartons and run into the apparatus for filling, and after filling may be run off to the cooling room. The substance with which the cartons are to be filled may be supplied to the filling lid in any convenient manner. Thus, for instance, I have shown a sliding hopper which may be moved across the lid for filling the cartons whose open tops are exposed at the lid orifices.

I provide means whereby the space or clearance between the table and the filling lid, when in their separated position, may be adjusted so that the apparatus may be regulated to accommodate cartons of different heights. Thus, for instance, my apparatus may be adjusted for filling quart, pint or half pint cartons.

The lid orifices are preferably flared below to facilitate the insertion of the tops of the cartons into the same, while the upper portions of said orifices fit the cartons snugly, so that when the tops of the cartons are inserted into said orifices with their top edges flush with the floor surface of the lid the cartons may be filled brim full without distorting their tops or causing the substance to run down outside of the cartons.

I provide novel and convenient means for holding the cartons rigidly in place on the table for the filling and lidding operation.

Other novel features of construction and also of arrangement of parts will appear from the following description.

Figures 10, 11:
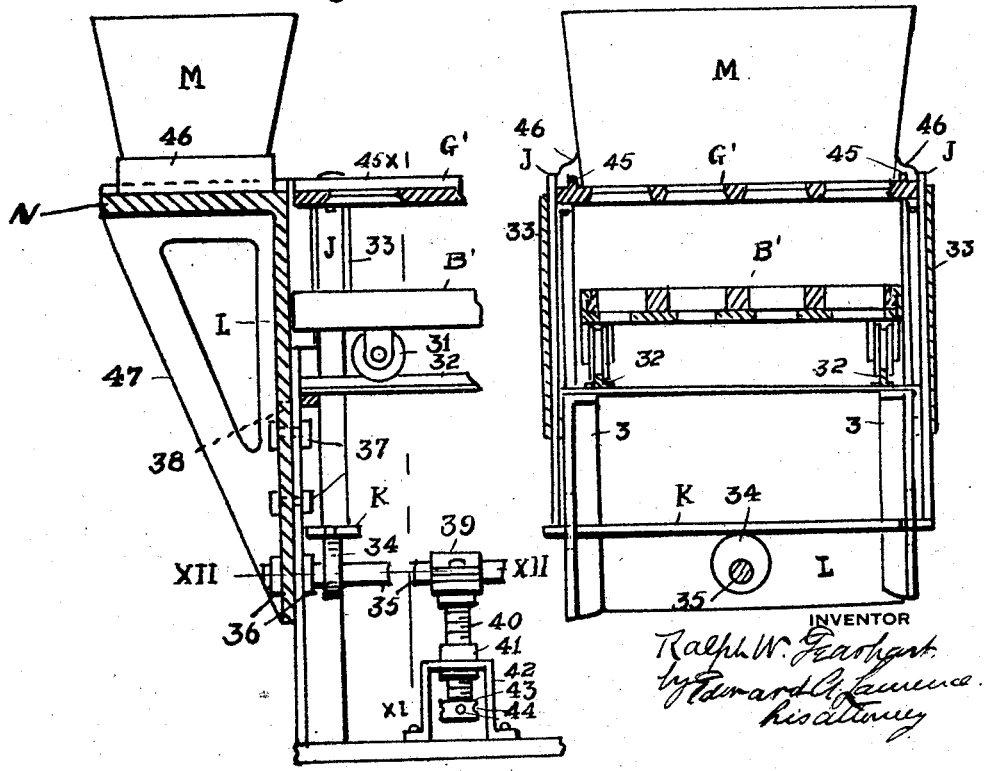

In the accompanying drawings, which are however merely intended to be illustrative of the principles of my invention without limiting its scope to the construction shown, Fig. 1 is a side elevation of apparatus embodying the principles of my invention, the structure being partially broken away in section to show parts; Fig. 2 is a plan view of the apparatus with the filling lid omitted; Fig. 3 is an enlarged detail in section along the line III—III in Fig. 2; Fig. 4 is a partial end view on enlarged scale of the apparatus illustrated in Fig. 1, the cartons and clamping plates being omitted; Figs. 5, 6, and 7 are plan views of the clamping plates used; Fig. 8 is an enlarged transverse section of the filling lid; Fig. 9 is a view similar to Fig. 1 but showing a modification wherein the carton table is developed as a car; Fig. 10 is a broken longitudinal section showing a further modification wherein the filling lid is raised and lowered instead of the carton table with the filling hopper added; Fig. 11 is a vertical section of the same along the line XI—XI in Fig. 10, and Fig. 12 is a broken horizontal section along the line XII—XII in Fig. 10 and showing both ends of the apparatus.

The following is a detailed description of the drawings, reference being first had to Figs. 1 to 7 inclusive.

A represents the support or frame which forms the bed of the machine, and whose top portion is formed of the longitudinal side bars 1 and transverse end bars 2. 3 are framed legs which form the ends of the support A and which are connected by framed side panels 4. B represents the carton table having a flat floor 5 preferably reinforced beneath by the longitudinal ribs 6. The floor 5 is defined along its longitudinal edges by the upwardly extending and inwardly faced angle flanges 7 which form guides for the clamping plates, as will be later described. One end of the floor 5, the left end in Figs. 1 and 2, is defined by the transverse flange 8. On the other end of the table is mounted a clamping eccentric C pivoted on a vertical axis and provided with a handle 9.

The table B is supported on the frame A in such a manner as to be raised and lowered relative thereto. Thus the yoke brackets 10 have their upper, bifurcated ends bolted to the under side of the table B just inside of the legs 3, and the depending stems of said brackets are formed by the threaded sleeves 11, in which are screwed the screw shafts 12. The shafts 12 are journaled near their lower ends in the bearings 13 extending inwardly from the legs 3. The shafts are supported in place in the bearings as by the collars 14 held on the shaft by the set screws 14ᵃ and resting on the bearings 13. 15 represents pinions fixed on the lower ends of said shafts and in mesh with similar pinions 16 mounted on the horizontal shaft 17 which extends longitudinally of the table and is journaled in bearings 18 in the legs 3. One end of the shaft is provided with a crank handle 19. Thus by rotating the shaft 17 the table B may be raised or lowered on the table A. The cartons or containers to be filled, indicated by the reference numeral D, are of non-angular, such as circular, cross sectional shape, and are assembled for filling on the table B. The floor of the table is preferably provided with openings 20 corresponding in shape to the shape of the cartons but of less diameter than the latter. The purpose of the openings is both to reduce the amount of metal required in the table and also to render it easily drained and cleaned.

The cartons are snugly held or clamped in position on the table by means of recessed clamping plates, of which three types are used. Thus the plate E shown separately in Fig. 5 is the stationary plate which is first slid into place against the fixed end flange 8 of the table as shown at the left end of the table B in Fig. 2. This plate has recesses 21 formed on its inner edge which are of proper contour to fit half way around the cartons.

The intermediate clamping plates F, one of which is shown separately in Fig. 6, are provided with similar recesses 21 on both their longitudinal edges, while the end plate G, shown separately in Fig. 7, has said recesses on one edge only, while its opposite or outer edge is provided with a flat edge surface 22 to be engaged by the perimeter of the clamping eccentric C.

The ends of the clamping plates E, F and G are reduced to form the lips 23 which engage under the undercut flanges 7 of the frame A, so that the plates are maintained in proper alinement.

When the cartons D are to be filled they are assembled with the clamping plates E, F and G on the table A, each transversely disposed row of cartons being loosely encompassed by the walls of the recesses of the adjacent clamping plates. The eccentric C is then turned to exert pressure on the end clamping plate G, thus forcing the clamping plates snugly together and into engagement with the cartons, and thereby locking the cartons rigidly in position on the table A for the filling operation.

24 represents set screws extending through the end flange 8 and engaging the clamping plate E, thereby enabling the positions of the cartons to be accurately regulated in relation to the orifices of the filling lid H.

The filling lid H is preferably of open box or tray form, and is provided at one side with the outwardly and downwardly extending hinge lugs 25 which are hingedly connected by means of the bolts 26 to the tops of the standards 27 extending up from the rear of the table A. 28 represents corresponding standards on the front of the table whose tops are engaged by the recessed lugs 29 on the front of the lid. Thus, the lid H is supported in a horizontal position for the filling operation, and may be swung up out of the way to permit the removal of the cartons.

The floor of the lid H is provided with orifices 30 which, when the lid is in its horizontal position, fit down over the upper portions of the cartons D, with the tops of the cartons flush with the upper ends of the orifices. The under portions of said apertures are flared or beveled, as shown in Fig. 8, so as to automatically center the cartons as the lid is swung down. The set screws 24 are provided for the purpose of insuring proper spotting of the cartons under the orifices but the flare of the lower ends of the orifices facilitate the proper insertion of the tops of the cartons in the orifice with the top edges of the cartons flush with the top surface of the floor of the filling lid.

The upper ends of said orifices 30 fit the upper ends of the cartons snugly so as to hold them in shape during filling and also to prevent any of the substance, such as more or less fluid ice cream, from running down outside of the cartons. The ice cream may be poured into the tray-like lid H and scraped or otherwise forced into the cartons, filling the same, the tops of the cartons being flush with the top surface of the floor of the lid and snugly fitting the upper portions of the lid orifices.

When the cartons are to be loaded into the machine the table B is depressed in its lowered position and the lid H is swung up out of the way. The cartons are then placed on the table B and clamped in position by the plates E, F, and G and the eccentric C. The lid is then swung down into its horizontal position and the shaft 17 is rotated to raise the table B until the upper ends of the cartons are inserted up through the apertures in the lid with their upper ends flush with the upper surface of the floor of the lid.

When the cartons have been filled, the shaft 17 is rotated in the opposite direction, depressing the table B and withdrawing the upper ends of the cartons from the apertures in the lid H. The lid is then swung up out of the way and the carton lids or covers are put on, and the cartons then are released by loosening the clamping plates and removed to the hardening room. The table B may then be reloaded with cartons and the operation repeated.

It is evident that cartons of different heights, such for instance as quart cartons, pint or half pint cartons, may be filled by the apparatus, the lid being lowered in each case sufficiently to properly engage the tops of the cartons for the filling operation.

In Fig. 9 I show a modification wherein the carton table B' is in the form of a car supported on wheels 31 running on the twin rail track I which is supported by the yoke brackets 10 in a manner similar to the mounting of the table B in the preceding figures of the drawings. Otherwise the structure shown in Fig. 9 is substantially identical with that of the preceding views of the drawings.

It is evident that by developing the carton table as a traveling car, a plurality of cars may be provided, and the cars may be loaded with cartons adjacent to the one end of the machine, such for instance to the left in Fig. 9, run in turn onto the track I, the track elevated to insert the tops of the cartons up into the orifices in the loading lid, the cartons filled, the track then depressed, and the car run off to the right; the covers placed on the cartons and the car with its load run to the hardening room. Meanwhile another truck loaded with empty cartons is run onto the track I, and the operation repeated.

Thus the output of the filling apparatus is greatly increased.

In Figs. 10 to 12 inclusive I show a further modification in the apparatus. One difference is in the fact that instead of the carton table being movable vertically to bring the cartons into and out of engagement with the orifices of the filling lid, the lid is made movable for that purpose. Also I show a sliding filling hopper which greatly facilitates the filling operation.

In the case of this embodiment, I have shown the table in the form of a wheeled car B', as in Fig. 9; but the tracks 32 on which the car runs are fixedly mounted on the frame A.

The loading lid G' is attached to the upper ends of four vertically disposed posts J which are slidable in guides 33 secured to the frame A. The lower ends of the pairs of opposed posts are secured to and coupled together by transversely disposed foot plates K which ride on eccentric cams 34 carried by the horizontal shaft 35 disposed longitudinally of the machine. The shaft is journaled in bearings 36 in vertically disposed plates L and L' which are clamped against the outer sides of the end supports 3 of the frame A by the bolts 37. It is evident that by rotating the shaft 35 the filling lid G' may be lowered to engage the tops of the cartons or may be elevated to clear the same to permit the removal of the filled cartons by running off the car G'.

The bolt holes 38 in the plates L and L' are vertically slotted so that the plates and the shaft 35 are capable of being raised or lowered relative to the position of the table car B' on the track.

The shaft 35 is journaled at its center in the two part sleeve bearing 39 which is swiveled on the upper end of a screw shaft 40 which is screwed through a fixed nut 41 mounted on the box bracket 42. The lower end of the shaft is provided with a head 43 pierced with holes 44 for the insertion of a lever-rod for rotating the screw shaft and thus raising or lowering the shaft 35 and the plates L and L'.

The purpose of raising and lowering the shaft 35 is to adjust the low position of the loading lid G' so that cartons of different heights may be filled, the low position of the lid being regulated so that the tops of the cartons will be properly inserted up into the orifice 30 in the loading lid.

In this modification the loading lid is unprovided with sides and ends so that a sliding hopper M may be used.

Said hopper is of proper width to span in turn the transversely disposed rows of orifices 30 in the lid as the hopper is moved along the lid, and has an open mouth which is in sliding contact with the top surface of the lid. The hopper slides on guide rails 45 extending along the longitudinal edges of the lid, the hopper being provided with slotted foot plates 46 which engage said rails. When not in use the hopper M is supported on a platform N alined with one end of the lid G' and also provided with guide rails 45 alined with those of the lid. The platform N may be supported by brackets 47 extending up from the plate L so that the low position of the platform may be adjusted in unison with that of the lid, and the platform will be raised and lowered with the lid by the rotation of the shaft 35.

When a table car B' loaded with empty cartons is run on the track, the shaft 35 is rotated to lower the lid G' so that its orifices receive the tops of the cartons. The hopper M, filled with semi-fluid ice cream, or other substance, is then slid along the lid, the substance flowing down through the mouth of the hopper and filling the cartons and the excess substance being swept along by the sliding contact of the hopper with the lid. When the cartons have all been filled, the hopper is slid back in the reverse direction onto the platform N which seals the bottom of the hopper against the escape of the substance. The shaft 35 is then rotated to raise the lid, thus disengaging the tops of the cartons therefrom, and the car is run off the machine and a fresh car loaded with empty cartons substituted and the operation is repeated.

By adjusting the elevation of the shaft 35 and the plates L and L' the low position of the lid and the hopper may be regulated to suit cartons of various heights, such as quart, pint or half pint cartons.

It is apparent from the foregoing description that by the use of my improved carton filling apparatus, the manufacturer of ice cream and other frozen food products, and like substances, may pack and distribute his products in cartons or other containers for distribution in package form with but little extra expense compared to the bulk plan of distribution. Experience shows that the retailer suffers an average loss of at least twenty per cent in the distribution of ice cream when it is delivered to him in bulk form and packed by him for the customers. Again, it is difficult to maintain proper sanitation in handling bulk ice cream in retail distribution, and the maintenance of proper refrigeration is difficult and requires more or less constant attention. Consumers are rapidly becoming educated to prefer package ice cream, as it is more attractive and appeals to them on the ground of convenience and also sanitation.

While my invention is particularly applicable for use with ice cream and other semi-frozen or semi-solid substances, it is evident that it may be used for filling containers with powdered, granular or other more or less divided solids and other substances.

Although for the sake of clearness I have described in detail the embodiments of the principles of my invention illustrated in the drawings, I do not wish to limit myself thereby but claim broadly.

1. In apparatus for filling containers with semi-solid and other substances, the combination of a table having a top surface upon which the empty containers are placed, a filling receptacle supported above said table and having its bottom provided with a plurality of apertures adapted to receive the upper ends of the containers mounted on said table, connections for causing relative movement between said table and receptacle whereby after the containers are mounted on said table their filling ends may be inserted into said apertures, a plurality of clamping plates mounted to slide parallel to the surface of the table and having their adjacent edges recessed to form means for engaging the containers laterally, a stationary member against which one end plate bears, and a movable member bearing against the opposite end plate whereby said plates may be clamped in position to spot the containers relative to the apertures.

2. In apparatus for filling containers with semi-solid and other substances, the combination of a table having a top surface upon which the empty containers are placed, a filling receptacle supported above said table and having its bottom provided with a plurality of apertures adapted to receive the upper ends of the containers mounted on said table, connections for causing relative movement between said table and receptacle whereby after the containers are mounted on said table their filling ends may be inserted into said apertures, a plurality of clamping plates mounted to slide parallel to the surface of the table and having their adjacent edges recessed to form means for engaging the containers laterally, a stationary member against which one end plate bears, a movable member bearing against the opposite end plate whereby said plates may be clamped in position to spot the containers relative to the apertures, and means for exerting pressure on said movable member whereby the plates may be tightened into position for spotting the containers relative to the apertures.

3. In apparatus for filling containers with semi-solid and other substances, the combination of a table having a top surface upon which the empty containers are placed, a filling receptacle supported above said table and having its bottom provided with a plurality of apertures adapted to receive the upper ends of the containers mounted on said table, connections for causing relative movement between said table and receptacle whereby after the containers are mounted on said table their filling ends may be inserted into said apertures, a plurality of clamping plates mounted to slide parallel to the surface of the table and having their adjacent edges recessed to form means for engaging the containers laterally, a stationary member against which one end plate bears, a movable member bearing against the opposite end plate whereby said plates may be clamped in position to spot the containers relative to the apertures, means for adjusting the position of the stationary member, and a movable member bearing against the opposite end plate, and means for forcing the movable member toward the stationary member whereby the containers may be clamped in spotted relation to said apertures.

4. In apparatus for filling containers with semi-solid and other substances, the combination of a table upon which the empty containers are placed, a filling lid supported above the table and provided with orifices to receive the upper ends of the containers, connections for causing relative vertical movement between the table and the lid, members slidably mounted on said table and recessed to engage said containers to hold them in place, means for clamping said members in operative position, and means for adjusting the operative position of said members to properly spot the containers relative to the orifices in the lid.

5. In apparatus for filling containers with semi-solid and other substances, the combination of a filling table on which the empty containers are mounted, a filling lid mounted above said table, said lid being provided with apertures to receive the upper ends of the containers, connections whereby relative vertical movement may be caused between the table and the lid when the latter is horizontally disposed whereby the upper ends of the containers may be inserted in the apertures for the filling operation and may be withdrawn from the apertures after the containers are filled, and a filling hopper slidably mounted on said lid whereby the contents of said hopper is fed down through the apertures into said containers.

6. In apparatus for filling containers with semi-solid and other substances, the combination of a filling table having a continuous top on which the empty containers are mounted, a filling lid mounted above said table, said lid being provided with apertures to receive the upper ends of the containers, connections whereby relative vertical movement may be caused between the table and the lid when the latter is horizontally disposed whereby the upper ends of the containers may be inserted in the apertures for the filling operation and may be withdrawn from the apertures after the containers are filled, and a filling hopper slidably mounted on said lid and having its mouth in sealing contact therewith whereby the contents of said hopper is fed down through the apertures into said containers.

7. In apparatus for filling containers with semi-solid and other substances, the combination of a table having a continuous top upon which the empty containers are placed, said table being provided with vertical edge flanges having slots therein, a filling lid supported above said table and provided with orifices to receive the upper ends of the containers, connections for causing relative vertical movement between the table and the lid, and members slidably mounted in said slots and recessed to engage said containers laterally to clamp them in position on the table in alinement with the orifices in said lid.

8. In apparatus for filling containers with semi-solid and other substances, the combination of a table having a continuous top upon which the empty containers are placed, said table being provided with vertical edge flanges having slots therein, a filling lid supported above said table and provided with orifices to receive the upper ends of the containers, connections for causing relative vertical movement between the table and the lid, members slidably mounted in said slots and recessed to engage said containers laterally to clamp them in position on the table in alinement with the orifices in said lid, and means for moving said members into clamping position.

9. In apparatus for filling containers with semi-solid and other substances, the combination of a frame, a horizontally disposed track carried by said frame, a car adapted to run on said track and provided with a table upon which the empty containers are placed for filling, a filling receptacle carried by said frame above said track and provided with apertures in its bottom into which the open ends of said containers may be inserted, and means for elevating said car whereby the open ends of said containers are inserted into said apertures for filling.

10. In apparatus for filling containers with semi-solid and other substances, the combination of a frame, a horizontally disposed track carried by said frame, a car adapted to run on said track and provided with a table upon which the empty containers are placed for filling, a filling receptacle carried by said frame above said track and provided with apertures in its bottom into which the open ends of said containers may be inserted, and means for elevating said track whereby the open ends of said containers are inserted into said apertures for filling.

Signed at Clearfield, Clearfield County, Pennsylvania, this 1st day of April 1924.

RALPH W. GEARHART.